United States Patent [19]

Cassonnet et al.

[11] Patent Number: 4,511,983
[45] Date of Patent: Apr. 16, 1985

[54] APPARATUS FOR CONTROLLING MICROINSTRUCTIONS STORED IN A DATA PROCESSING UNIT MEMORY

[75] Inventors: Jean-Claude M. Cassonnet, Conflans Sainte-Honorine; Marie-Odile Lamarche née Lechevin, Pantin, both of France

[73] Assignee: Compagnie Internationale pour l'Informatique CII-Honeywell Bull (Societe Anonyme), Paris, France

[21] Appl. No.: 219,388

[22] Filed: Dec. 22, 1980

[30] Foreign Application Priority Data

Dec. 27, 1979 [FR] France ................. 79 31793

[51] Int. Cl.³ .................. G06F 9/00; G06F 9/20
[52] U.S. Cl. .............................................. 364/200
[58] Field of Search ... 364/200 MS File, 900 MS File

[56] References Cited

U.S. PATENT DOCUMENTS

| 4,025,901 | 5/1977 | Bachman | 364/200 |
| 4,030,072 | 6/1977 | Bjornsson | 364/200 |
| 4,041,461 | 8/1977 | Kratz et al. | 364/200 |
| 4,101,967 | 7/1978 | Hajduk | 364/900 |

OTHER PUBLICATIONS

Bit-Slice Microprocessor Design by Mick & Brick, McGraw Hill Co. ©1980.

Primary Examiner—Gareth D. Shaw
Assistant Examiner—John Gladstone Mills
Attorney, Agent, or Firm—Lowe, King, Price & Becker

[57] ABSTRACT

A controller for microinstructions grouped into microprogram segments, each of which defines a base of a microprogram segment which is to be executed, includes a bank of addressable base registers. Each register in the bank stores an indication of a base in the memory. Registers in the bank are addressed so that the addressed register derives a signal indicative of the base address. Included are an address register for the memory and an output register for microinstructions read from the memory. The address and output registers respectively have outputs and inputs coupled to an address input and a read output of the memory. An adder has inputs responsive to the base indicating signal of the addressed register and to an output of the memory output register. The adder has an output coupled to an input of the address register. The output of the memory output register is coupled to an input of the means for addressing registers in the register bank to control which register of the base register bank is addressed.

6 Claims, 1 Drawing Figure

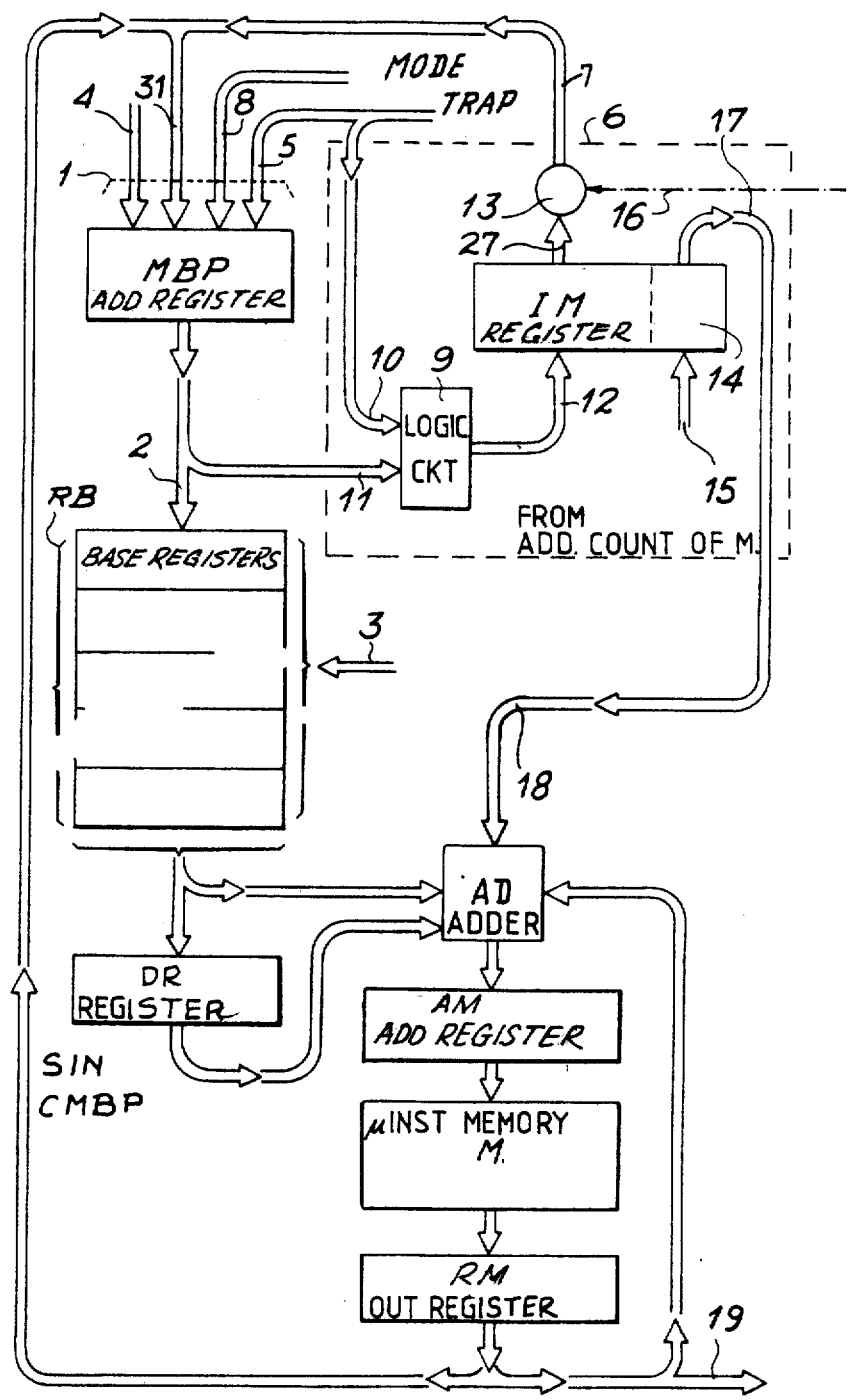

APPARATUS FOR CONTROLLING MICROINSTRUCTIONS STORED IN A DATA PROCESSING UNIT MEMORY

TECHNICAL FIELD

The present invention relates to devices for controlling microinstructions stored in a data processing unit memory and to an apparatus for executing microprograms in microprogrammed data processing units and, more particularly, to a device for controlling microinstruction addresses grouped into segments of microprograms which are defined by different bases. The present invention is also applicable to devices for safeguarding base addresses and return addresses of microprograms that are interrupted as they are being executed.

BACKGROUND ART

The majority of presently available data processing units use microprogramming. In microprogramming, tasks which are to be performed are divided into microprograms. Microprograms are formed by a number of microinstructions, which are generally stored in a control memory of a control unit of a data processing system. A logic instruction of a microprogrammed data processing unit commonly employs several microinstructions. All of the microprograms constitute what is generally referred to as the micrologic of the processing unit. The micrologic of the processing unit cooperates with the hardware of the processing unit, as well as with the overall logic of the processing unit. The micrologic is generally written in a read-only memory of a central processing unit of the data processing system. The micrologic may also be written in a read-write section of a central memory of the data processing unit. The read-write section of the central unit of the data processing system where the micrologic is written is usually capable of being reconfigured.

A typical prior art system in which microprogram segments are defined by different base addresses and are located in a central memory of a data processing unit is described in commonly assigned French Patent No. 2,221,052, filed in France Mar. 6, 1973.

The different microprograms are arranged in functional blocks or modules defined by segments of microprograms. The microprograms stored in a read-write memory of the processing unit should remain inaccessible to the logic. Calls to the microprograms, in particular calls to the microprogram segments, are made in response to signals indicative of addresses for the base of the segments, as described in the previously mentioned patent. The base address is generally loaded into a register as a microprogram segment is called up from the memory where it is stored. The actual address of the microinstruction which is being sought within a microprogram segment is derived by adding a signal indicative of a base of a memory section containing the microinstruction to a signal indicative of an address within the memory section where the sought microinstruction is located. The address of the microinstruction address is relative to an address for the base of the memory segment containing the microinstruction.

The prior art systems for addressing program segments have the disadvantage of requiring an instruction that originates from logic circuitry for each base change. This type of device and operation are disadvantageous because it requires costly computer time. Furthermore, if a first microprogram is interrupted by a second microprogram having a base different from the first microprogram, the prior art addressing devices do not safeguard the contents of a register storing a signal corresponding to the base of the memory segment where the first microprogram is located. Thus, there is a possibility, in such an instance, for the base of the first microprogram to be lost so that the first microprogram is not properly entered. Finally, no prior art device of which I have knowledge is able to change microprograms simply and rapidly enough to permit very rapid modifications of an operational mode of the processing unit responsive to the microprograms. In modern data processing units, one such exemplary operational mode change involves changing the operation of the system from one machine to another machine.

It is, accordingly, an object of the present invention to provide a new and improved device for controlling microinstructions stored in a data processing unit memory.

Another object of the present invention is to provide a new and improved device for controlling microinstructions in a data processing unit memory such that there is rapid addressing of microinstructions grouped into microprogram segments starting from a base address of the segments.

Another object of the invention is to provide a new and improved apparatus for facilitating restarting of interrupted microprogram segments.

Still another object of the invention is to provide a new and improved apparatus for facilitating selection of microprograms.

A further object of the invention is to provide a new and improved apparatus for facilitating selection of microprogram segments.

Yet another object of the invention is to provide a new and improved apparatus for facilitating changes in the operational mode of a data processing unit.

DISCLOSURE OF THE INVENTION

The present invention is applicable to a device for controlling microinstructions stored in a memory of a data processing unit wherein the instructions are grouped into microprogram segments. Each microprogram segment is defined by a base as a function of each microprogram segment which is to be run. Address and output registers are provided for the memory and have outputs and inputs respectively connected to address inputs and read outputs of the memory. A base register bank is provided so that each register in the bank stores a base address for a different segment of the memory containing different microprogram segments. An adder is responsive to an output of the base register bank and to an output of the memory output register. The registers of the base register bank are addressed in response to several signals, one of which is derived from the memory output register.

Addressing or locating means for the registers in the base register bank is formed by an addressing register for the base registers. An output signal of the register bank addressing register is coupled to addressing inputs of the registers in the base register bank. The addressing or locating means for the base register is responsive to a control input source that is responsive to binary signals contained in the microinstructions of each read segment and corresponding to the address of the base register to be located during the execution of the microprograms. The addressing register for the base register bank includes second inputs that address the base registers as they are loaded with addresses for the memory segment bases so that it is possible to locate the base registers at the instant that the microprogram segments are about to be run.

According to still another feature, the address register for the base register bank includes a third set of inputs that load the base register bank with data that control interruption of a microprogram being executed. Outputs of the address register for the base register bank are connected to an input of a safeguarding circuit for the address of the register in the base register bank that corresponds to the microprogram segment that is being executed at the instant of interruption. Outputs of the safeguarding circuit are connected to the first inputs of the address register for the base register bank, to control resumption of the interrupted microprogram segment when the interrupted segment is again to be executed.

According to another feature of the invention, the address register for the base register bank includes four inputs that control the locating action of the particular base registers.

According to still another feature of the invention, the base registers are loaded with data relating to the bases of microprogram segments which respectively control particular operational modes of the data processing unit.

In accordance with still a further feature of the invention, the safeguarding circuit that assures correct resumption of the interrupted microprogram includes a safeguarding register that is responsive to an AND type logic circuit. The logic circuit has inputs which are responsive to the outputs of the locating register, as well as to the third source which supplies signals to the locating register. In response to the output of the locating register being the same as the third signal, the safeguarding register is supplied with the third signal. A control gate is responsive to the output signal of the safeguarding register, so that the contents of the safeguarding register are supplied to the first input of the locating register in response to a predetermined signal being supplied to the gate. The predetermined signal is derived when a control signal is received from the data processing unit to indicate that the interrupted microprogram is to be resumed.

According to still a further feature of the invention, the safeguarding register includes a section for storing the address of the microinstruction that was being executed at the instant of interruption. This section has inputs responsive to outputs of an address counter of the memory, and outputs connected to other inputs of the adder. The adder couples the output of this section of the safeguarding register to an address register for the microinstruction memory.

The above and still further onjects, features and advantages of the present invention will become apparent upon consideration of the following detailed description of one specific embodiment thereof, especially when taken in conjunction with the accompanying drawings.

BRIEF DESCRIPTION OF THE DRAWING

The single FIGURE of the drawing is block diagram of an apparatus for controlling microinstructions in accordance with a preferred embodiment of the invention.

BEST MODE FOR CARRYING OUT THE INVENTION

Reference is now made to the FIGURE wherein there is illustrated a central memory M of a data processing unit. Memory M stores microinstructions that are grouped in a known manner into several microprogram segments, as described in the previously mentioned patent. Each microprogram segment of memory M is defined by a base or base address. Access to each segment is provided by the different microinstructions contained in the segment.

The apparatus of the FIGURE for accessing microinstructions in memory M includes a bank of addressable base registers RB which is addressed in response to output signals of locating or address register MBP as a function of each microprogram segment which is to be run or connected. In a known manner, the apparatus of the FIGURE also includes an address register AM for addressing memory M, as well as output register RM in which are stored microinstructions read from memory M. Registers AM and RM have outputs and inputs respectively connected to an address input bus of memory M and to signal output terminals of memory M. The device of the FIGURE also includes an adder or accumulator AD having inputs responsive to signal output terminals of the addressed register of register bank RB and to the output signal of memory M, as stored in memory output register RM and derived from signal output terminals of the output register. An address counter (not shown) associated with memory M makes it possible to pass from one microinstruction to a subsequent microinstruction in a microprogram being executed. To this end, the address counter is incremented each time a microinstruction is executed in a microprogram that is being executed. Virtually all of the apparatus described infra with regard to the FIGURE is known in the prior art and need not be described in greater detail.

In accordance with an important aspect of the present invention, the registers in base register bank RB are addressed by a multi-bit output of addressing register MBP, in turn responsive to several different multi-bit sources. Register MBP is basically a buffer register having a number of stages, each of which is loaded by one bit of several multi-bit sources, one of which is coupled at a time to register MBP. Addressing register MBP has a multi-bit output that is coupled to addressing input terminals 2 of base register bank RB.

Inputs 1 of addressing register MBP for base register bank RB are responsive to four different multi-bit sources. When the system is initially put into operation, the registers in base register bank RB are loaded via multi-bit input 3 from the data processor of which the apparatus of the FIGURE is a part. The signals supplied to input 3 of the registers in bank RB define segment bases within microinstruction memory M. Selection of one of the registers in bank RB for each signal at input 3 is in response to multi-bit source 4, coupled to address register MBP from the data processor. Thus, the data processing unit provides a correlation for the signals supplied to terminals 3 and 4 so that the correct register within register bank RB is addressed for the signals that define the segment bases of memory M. Input terminals 31 of address register MBP are responsive to certain bits of a multi-bit output signal of output register RM for microinstruction memory M. The output terminals of memory RM which are coupled to input terminals 31 of address register MBP indicate the address of the base register to be located during execution of the microprogram segment. Thus, each microinstruction segment loaded into memory M must include the address of the register in base register bank RB where the next microinstruction segment base is located. Addressing register MBP includes input terminals 5 responsive to a multi-bit signal from the data processing unit, which signal controls interruptions of microprogram execution, and is indicated by "TRAP".

Addressing register MBP includes a further multi-bit input 8 responsive to signals from the data processing unit of which the apparatus of the FIGURE is a part. The multi-bit input 8 of addressing register MBP is responsive to a signal "MODE" which make it possible to address particular registers in register bank RB. The value of signal "MODE" relates to microprogram segment bases for particular operational modes of the processing unit of which the present invention is a part. These operational modes may, for example, be modes of simulating another machine. In the embodiment illustrated in the FIGURE, the bases of the microprogram segments relating to the operational mode of the processing unit are generally loaded in the first two registers of register bank RB.

The multi-bit output of address register MBP, in addition to being coupled as an address input to base register bank RB, is coupled to network 6. Network 6 safeguards or stores addresses of registers in register bank RB corresponding to microprogram segments which are interrupted while a microprogram is being executed. When the interrupt has been completed, safeguard circuit 6 derives a multi-bit output 7 which is coupled to multi-bit input 31 of address register MBP. Thereby the same microinstruction which was read from memory M at the time of the interrupt is resumed when the interrupt has been completed.

To these ends, safeguard network 6 includes buffer register IM and logic circuit 9, in the form of an AND gate array having input terminals 10 and 11 respectively responsive to the interrupt command "TRAP" signal for the microprogram and the multi-bit output of address register MBP. In response to a predetermined relationship for the bits in signal "TRAP", associated with an interrupt command for the microprogram, logic circuit 9 is activated to couple the address signal in address register MBP to multi-bit input 12 of register IM. Register IM includes a multi-bit output 27 which is coupled to one set of inputs of gate 13, having a second input responsive to a RETURN signal supplied to lead 16 by the data processor of which the apparatus of the FIGURE is a part. Normally, gate 13 is closed, whereby the multi-bit signal at output 27 of register IM is not coupled through gate 13. When an interrupt operation has been completed, however, the data processor supplies a binary one signal to lead 16, to enable gate 13, whereby the multi-bit signal on output 27 of register IM is coupled to multi-bit output 7 of safeguard circuit 6; thence, the output of safeguard network 6 is coupled to multi-bit input 31 of address register MBP.

Safeguard register IM includes section 14 in which is stored the address of the microinstruction being executed at the instant an interrupt command occurs, i.e., memory section 14 stores a signal indicative of the address in memory M where the microinstruction is located that is being executed at the time signal "TRAP" is derived. To this end, the address counter of memory M, which is incremented each time a new microinstruction is read from memory M, is coupled as a multi-bit signal to multi-bit input 15 of section 14. Section 14 of safeguard register IM includes a multi-bit output 17 that is coupled to multi-bit input 18 of binary adder AD. The signal in the address counter is coupled to input 15 of register section 14 via a logic circuit (not shown) similar to logic circuit 9 and responsive to signal "TRAP". Thus, in response to an interrupt, as indicated by signal "TRAP" having a predetermined bit sequence, the address of the register in base register bank RB which had been selected for executing a given microprogram segment is safeguarded in the section of register IM coupled to input 12 and output 27 of the register. In addition, the address of the interrupted microinstruction, with respect to the corresponding base, is safeguarded in section 14 of register IM. When an interrupt has been completed, the address of the register in base register bank RB which has been safeguarded in register IM is again fed into address register MBP, while the address relating to the interrupted microinstruction is fed from section 14 of register IM to address register AM for memory M via adder AD. This circuitry makes it possible to locate the address of the interrupted microinstruction in memory M.

Microinstructions read from memory M, as stored in output register RM of memory M, are applied via multi-bit output 19 of register RM to appropriate, known circuitry within the data processing unit of which the apparatus of the FIGURE is a part. Base changes are denoted by particular microinstructions "SIN" and "CMBP" at the multi-bit output of register RM associated with memory M. The "SIN" microinstructions make it possible to address plural registers, for example two registers, of the registers in register bank RB, in such a manner as to select one of plural microprograms specific to a particular operational mode of the data processing unit. The "CMBP" microinstructions make it possible to locate one of the registers in register bank RB at each base change.

The address counter of memory M is constructed in a known manner, and therefore is not illustrated in the FIGURE. The address counter of memory M makes it possible to assure a progression of microinstruction addresses, one by one, for the microprograms loaded into memory M. Memory M may be a read only ROM memory, or it may be part of a central memory of the data processing unit, in which case memory M would usually be a RAM.

The apparatus of the FIGURE also includes a buffer register DR having a multi-bit input responsive to the base segment address signal read from the addressed register in base register RB. Register DR has a multi-bit output that is coupled to one of the multi-bit inputs of binary adder AD. Register DR makes it possible to provide direct access to a base within memory M without utilizing address register MBP and is employed for recopying an existing base. In response to a base change, the new base is recopied into register DR.

The device of the FIGURE makes it possible, as previously stated, to facilitate addressing of microinstructions in microprogram segments contained in memory M of a data processing unit. The device also allows restarting of a microprogram segment after an interrupt.

While there has been described and illustrated one specific embodiment of the invention, it will be clear that variations in the details of the embodiment specifically illustrated and described may be made without departing from the true spirit and scope of the invention as defined in the appended claims.

We claim:

1. Apparatus for controlling microinstructions stored in a memory of a data processing unit, the microinstructions being grouped into microprogram segments, each microprogram segment being defined by a base as a function of each microprogram segment which is to executed, the apparatus comprising a memory address register for the memory, an output register for microinstructions read from the memory, said memory address register and output register respectively having outputs and inputs coupled to an address input of the memory and an output read from the memory, an adder having first and second inputs respectively responsive to (1) a signal indicating the base corresponding to the microprogram executed and (2) an output of the memory output register, the adder having an output connected to an input of the memory address register, a bank of base registers for storing bases of segments, means for addressing the base registers, outputs of the output register of the memory being connected to control inputs of the means for addressing base registers, the means for addressing the base registers comprising a base address register having outputs connected to address inputs of the base registers, the base address register having control inputs including: first and second inputs, the first input of the base address register loading the base address register with a binary signal contained in microinstructions of each segment, the first input corresponding to a base register in the base register bank which is addressed while the microprograms are being executed, the second input of the base address register being a signal indicative of addresses of the base registers which must be addressed while registers of the bank are loaded with signals indicative of the bases of the microprogram segments which are to be executed; and means for safeguarding the address of the base register of the bank which corresponds to a microprogram segment being executed when an interrupt occurs in the executed microprogram, the safeguarding means comprising: a safeguard register and a logic circuit including an AND gate array responsive to the address indicating output signal of the base address register and to the interrupt signal, the logic circuit deriving an output signal indicating the address of the register in the register bank containing the base segment at the time the interrupt signal occurs, means for coupling an output signal from the safeguard register to the base address register, said last named means including a logic control gate for coupling an output of the safeguard register to an input of the bank address register, the logic control gate having a control input responsive to a control signal for emptying the contents of the safeguard register into the base address register when the interrupted microprogram is resumed.

2. The apparatus of claim 1 wherein the base address register comprises further a third input responsive to a signal for controlling interruption of the microprogram being executed, outputs of the base address register being also connected to inputs of the safeguarding means, the safeguarding means having an output connected to a third input of the base address register to control the resumption of the execution of the interrupted segment.

3. The apparatus of claim 2 wherein the base address register further includes fourth inputs responsive to signals indicative of predetermined base registers in the bank.

4. The apparatus of claim 3 wherein predetermined ones of the base registers are loaded by signals corresponding to segments of a microprogram for controlling particular operational modes of the processing unit.

5. The apparatus of claim 1 wherein the safeguard register includes a section for storing the address of the microinstruction being executed when the interrupt occurs, said section being responsive to a signal from an address counter of the memory when the interrupt occurs, said section having outputs connected to other inputs of the adder.

6. The apparatus of claim 5 further comprising a current base register for storing a signal indicative of the current base to provide direct access to the base of the segment in the memory without use of the base address register so that a new base is supplied to the current base register during a change of base.

* * * * *